United States Patent [19]
Matthews

[11] 3,945,366
[45] Mar. 23, 1976

[54] OXYGEN SUPPLY SYSTEM FOR IC ENGINES

[76] Inventor: Roe I. Matthews, P.O. Box 67, Lowell, Ark. 72745

[22] Filed: Dec. 20, 1973

[21] Appl. No.: 426,538

[52] U.S. Cl. ....... 123/198 A; 123/119 E; 222/481.5; 220/202; 220/206
[51] Int. Cl.² ......................................... F02B 77/04
[58] Field of Search ........... 248/311, 313; 220/44 E, 220/44 R, 202, 206, 360, 366, 367; 123/198 A, 1 A, 25 A, 119 B, 119 E; 44/53, 72, 56; 222/381, 381.5

[56] References Cited
UNITED STATES PATENTS

| | | | |
|---|---|---|---|
| 797,471 | 8/1905 | Theuret | 222/481.5 |
| 1,190,586 | 7/1916 | Robertson | 222/481.5 |
| 1,448,752 | 3/1923 | Kopf | 123/198 A X |
| 1,485,497 | 3/1924 | Emerson | 123/25 A |
| 1,772,011 | 8/1930 | Malo | 123/198 A |
| 1,823,796 | 9/1931 | Everwine | 123/198 A |
| 2,333,310 | 11/1943 | Greening | 222/481 |
| 2,631,426 | 3/1953 | Jewett | 123/119 E |
| 2,632,637 | 3/1953 | Stone | 123/25 A X |
| 3,157,477 | 11/1964 | Emrick | 44/56 |
| 3,177,858 | 4/1965 | Vanderpoel | 123/119 B |
| 3,212,660 | 10/1965 | Adell | 248/313 |
| 3,410,671 | 11/1968 | Le Suer | 44/72 X |
| 3,413,105 | 11/1968 | Parsons et al. | 44/72 |
| 3,509,967 | 5/1970 | Ballard | 123/119 B X |
| 3,511,218 | 5/1970 | Lazarus | 123/119 B |
| 3,530,842 | 9/1970 | von Brimer | 123/119 B |
| 3,557,763 | 1/1971 | Probst | 123/198 A X |
| 3,749,376 | 7/1973 | Alm et al. | 123/1 A X |

*Primary Examiner*—Charles J. Myhre
*Assistant Examiner*—William C. Anderson
*Attorney, Agent, or Firm*—Clarence A. O'Brien; Harvey B. Jacobson

[57] ABSTRACT

A valve controlled disposable container, bracket mounted on the fire wall of an internal combustion vehicle for a selective feeding of a composition comprising a mixture of 90% hydrogen peroxide, 9% water, 0.5% nitro methane and 0.5% methanol to the intake manifold or carbureter of the engine.

2 Claims, 3 Drawing Figures

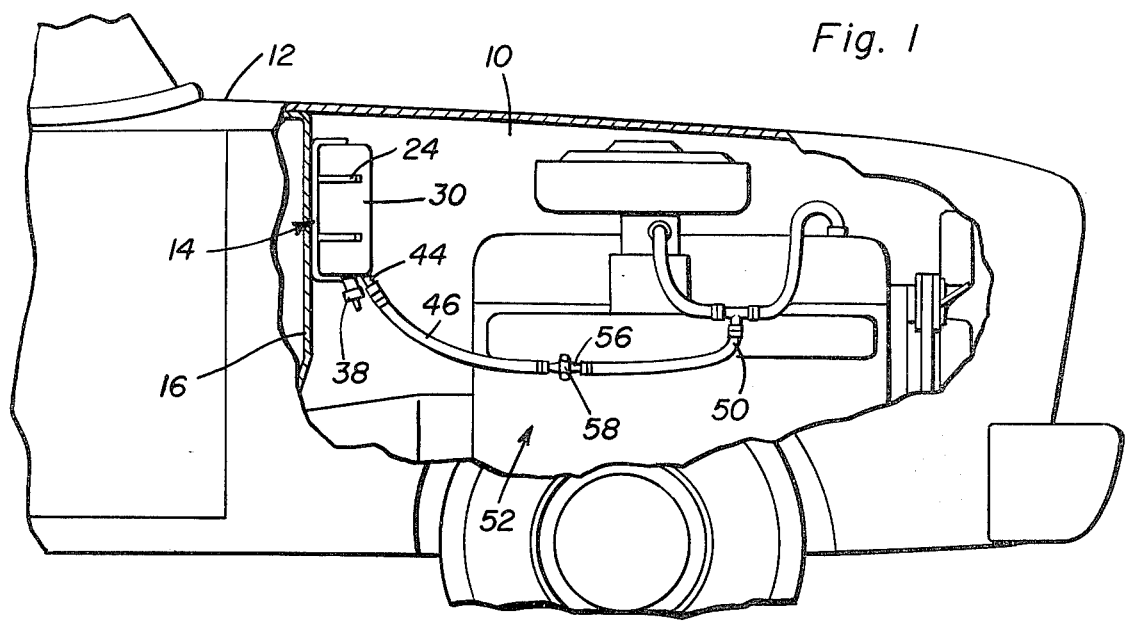
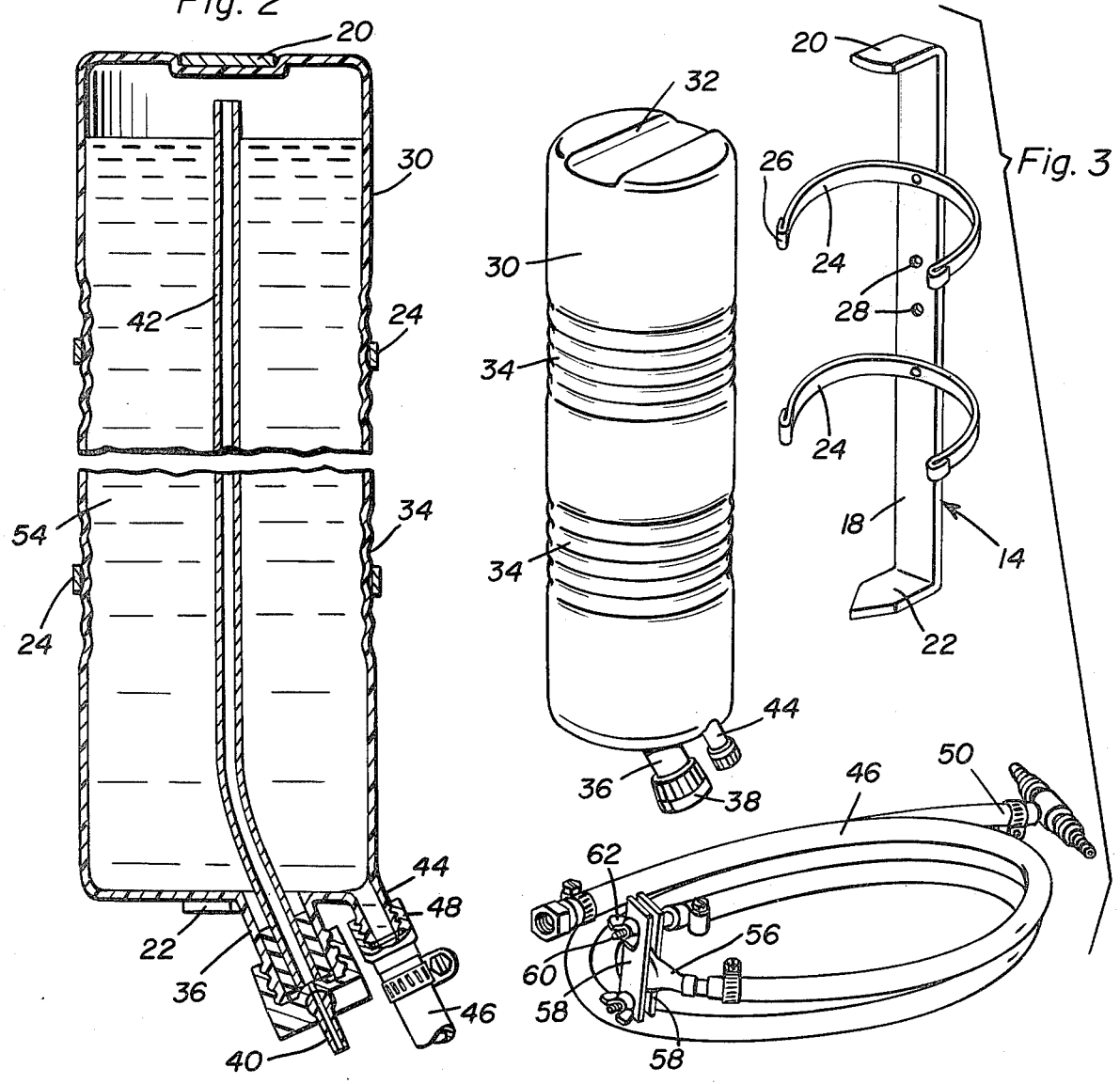

OXYGEN SUPPLY SYSTEM FOR IC ENGINES

The present invention generally relates to internal combustion engine operation, and is more specifically concerned with a system for increasing the operational efficiency thereof through the utilization of apparatus which enables the selective feeding of an engine additive uniquely adapted to effect a substantial reduction in pollutant in conjunction with an appreciable reduction in gas consumption.

One of the major problems facing the auto industry at the present time is the necessity of finding effective pollution reduction means. While many systems have been proposed, and in fact put into operation, the basic deficiency with such systems is the resulting substantial increase in gas consumption.

Accordingly, it is a primary object of the present invention to provide a unique system of pollution control which, in operation, actually results in an appreciable decrease in normal gas consumption.

In conjunction with the above, it is also an important object of the invention that the system be economical, easily installed and requires no modification of the engine construction other than the attachment of a bracket to the fire wall and the discharge end of a hose to feed into the carbureter or intake manifold.

In achieving the objects of the invention, the apparatus includes a bracket affixed to the fire wall of an engine compartment and releasably mounting an elongated container between upper and lower head and foot pieces. The container is retained by upper and lower pairs of spring arms. An elongated feed hose is removably coupled to an outlet nozzle on the bottom of the container with the second end of the hose coupled to the engine at any appropriate place for the introduction of the additive from the container. In order to enable a proper feeding of the additive, a selectively operable vent cap is mounted on the lower end of the container and communicated with the upper interior thereof through an elongated vent tube. The additive itself is highly significant and comprises a mixture of 90% hydrogen peroxide, 9% water, 0.5% nitro methane and 0.5% methanol.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a side elevational view of the forward portion of a motor vehicle with a section broken away so as to expose the engine compartment with the apparatus of the invention mounted therein;

FIG. 2 is an enlarged vertical cross sectional view through the additive container; and FIG. 3 is an exploded perspective view of the three basic components of the system apparatus.

Referring now more specifically to the drawings, it will be noted that FIG. 1 illustrates the engine compartment 10 of a conventional motor vehicle 12. The additive supply system of the invention is to be mounted therein utilizing primarily a bracket 14 affixed at a convenient location, preferably the fire wall 16.

The bracket 14 comprises a vertically elongated rigid flat bar 18 having laterally turned head and foot pieces 20 and 22. At vertically spaced points along the bar 18 are pairs of resilient or spring arms 24, each pair of arms formed from a single bowed piece of metal and provided with slightly rounded outer ends 26. Both pairs of arms are riveted or otherwise rigidly affixed to the bar 18 and project laterally in the same direction as the head and foot pieces 20 and 22. The central portion of the bar is provided with one or more apertures 28 for the reception of mounting screws, bolts or the like.

The bracket 14 is specifically constructed so as to releasably receive a vertically elongated cylindrical container 30. This container 30 is preferably made of plastic and disposable in nature. The length of the container is such so as to be snugly received between the head and foot pieces 20 and 22 with the upper end of the container 30 having a transverse slot 32 defined therein within which the head piece 20 fits. The circumference of the container 30 is such so as to be snugly received within and clamped by the resilient arms 24, such arms flexing slightly outward upon introduction or removal of the container 30. To facilitate sliding movement of the container into and out of the arms, the container 30 at vertically spaced points equal to the spacing of the arms 24, can be provided with corrugated sections 34.

The lower end of the container 30 is provided with a first outlet 36 closed by a cap 38 mounting an adjustable vent or venting nozzle 40. The outlet 36 communicates with the upper interior end of the container 30 through an elongated vent tube 42 sealed within the outlet 36 and opening to the selectively adjustable venting nozzle 40 so as to allow for a selective flow of air into the upper end of the container above the liquid level therein.

The container 30 also includes, at the bottom thereof, a second outlet 44 to which an additive distributing hose 46 is coupled in a releasable manner through a conventional hose coupling 48. As will be appreciated from the drawings, both outlets 36 and 44 are off-set from the center of the container 30 so as not to interfere with the bracket mounting of the container.

The hose 46 is of a length so as to place the second discharge end 50 thereof in communication with the internal combustion engine 52 at such a point as to provide for an introduction of the additive 54, contained within the container 30, to the engine at or slightly upstream of the carbureter or intake manifold. In the illustrated example, the discharge end 50 of the hose 46 is provided with a tee-coupling introduced into the line which draws off fumes from the PCV valve to the upstream side of the carbureter.

As a convenient means of controlling flow through the hose 46, a highly flexible section 56 can be mounted centrally therein and selectively compressed by a pair of parallel clamp plates 58 located to the opposite side thereof and interconnected by transverse bolts 60 and finger adjustable wing nuts 62.

Referring again to the venting cap 38, it will be noted that the vent nozzle 40 has a venting passage therethrough which can fully align with the vent tube 42 for a full venting of the interior of the container 30. By the same token, through the ball in socket arrangement of the venting nozzle 40 with the cap 38, any adjustment of the venting passage up to a complete shut-off thereof can be effected through a pivoting of the nozzle 40.

The present invention contemplates the utilization of a specific additive so as to produce an oxidizer vapor found to result in significant pollution reduction and substantially increased gas economy. This addition is a composition comprising a mixture of 90% hydrogen peroxide, 9% water, 0.5% nitro methane and 0.5% methanol which is drawn into the engine as a vapor through the hose 46.

From the foregoing, it will be appreciated that a unique system has been defined for supplying a fuel enhancing additive to an internal combustion engine. In addition a particular additive has been defined which, when introduced into the intake system of the internal combustion engine, results in a substantial reduction in pollution and gas consumption without requiring any elaborate or expensive engine modifications or the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an internal combustion engine of the type having a reduced pressure combustible mixture induction system, an additive supply assembly including a container, a quantity of liquid additive in the container, and a conduit communicating the container with the induction system for supplying additive thereto, that improvement comprising the arrangement in which said conduit is connected to the bottom of said container, said container including an air inlet in the bottom thereof, an air inlet tube extending upwardly from the air inlet to a point adjacent to the top of the container, said air inlet including a control valve to control inlet of air into said container for controlling the pressure therein thus controlling the outflow of additive through the conduit, said container being constructed of substantially unbreakable plastic material and disposable after use, said container also being in the form of an elongated cylinder with generally flat top and bottom ends, and a bracket mounting said container vertically by engaging the top, bottom and peripheral wall thereof, said top end of the container having a notch extending diametrically thereof, said bracket having horizontally disposed tongues frictionally engaging the ends of the container with the upper tongue received in the notch, said bracket including resilient clips engaging the central portion of the peripheral wall of the container, said air inlet and conduit being offset from the center of the bottom of the container to facilitate the reception of the bottom tongue.

2. The combination as defined in claim 1 wherein said conduit includes a flexible section, and opposed clamp plates for adjustably clamping the flexible section for restricting flow through the conduit, said conduit including a tee fitting at the end thereof remote from the container, said induction system of the engine including a conduit interconnecting a PCV valve and a carburetor assembly on the engine with the tee fitting on the conduit incorporated therein with the air inlet valve being adjusted to eliminate adverse affects upon flow of crankcase emissions from the PCV valve to the carburetor assembly, said liquid additive comprising a mixture of 90% hydrogen peroxide, 9% water, 0.5% nitromethane and 0.5% methanol.

* * * * *